W. H. KELLER.
VESSEL FOR THE CONVEYANCE OR STORAGE OF LIQUIDS.
APPLICATION FILED MAY 29, 1908.
916,450.
Patented Mar. 30, 1909.
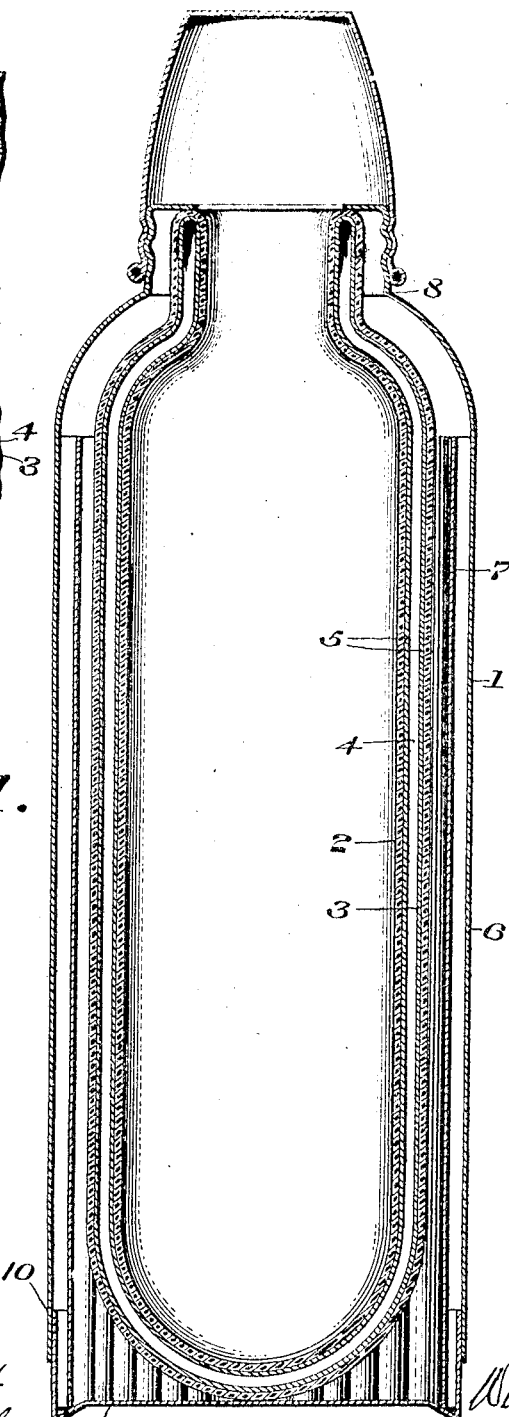
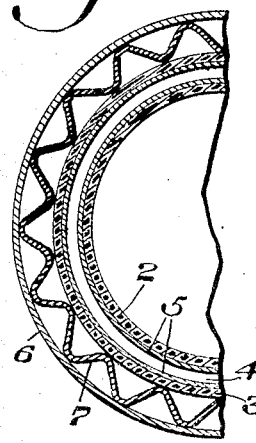
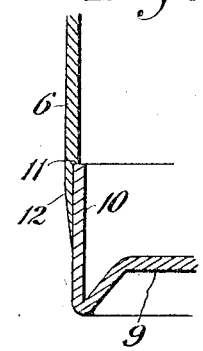
Witnesses
P. F. Nagle
L. Douville
Inventor
William H. Keller
By Wiedersheim & Fairbanks
Attorneys

UNITED STATES PATENT OFFICE.

WILLIAM H. KELLER, OF PHILADELPHIA, PENNSYLVANIA, ASSIGNOR TO CALORIS MANUFACTURING CO., A CORPORATION OF DELAWARE.

VESSEL FOR THE CONVEYANCE OR STORAGE OF LIQUIDS.

No. 916,450.　　　　　Specification of Letters Patent.　　Patented March 30, 1909.

Application filed May 29, 1908. Serial No. 435,793.

*To all whom it may concern:*

Be it known that I, WILLIAM H. KELLER, a citizen of the United States, residing in the city and county of Philadelphia, State of Pennsylvania, have invented a new and useful Vessel for the Conveyance or Storage of Liquids, of which the following is a specification.

My invention relates to a new and useful vessel for the conveyance or storage of liquids and consists of a novel closure for the casing.

It further consists of other novel features of construction, all as will be hereinafter fully set forth.

Figure 1 represents a vertical sectional view of a vessel for conveying or storing liquids. Fig. 2 represents a horizontal sectional view of a portion thereof. Fig. 3 represents a sectional view of a portion of the casing containing a slightly different form of connection between the bottom closure of the casing.

Similar numerals of reference indicate corresponding parts in the figures.

Referring to the drawings:—I have found in practice in the vessels now in use upon the market for the conveyance or storage of liquids that it is difficult to apply the casing to the glass receptacles and to have access to the said receptacles should occasion arise. My invention is designed to overcome these defects and in the drawings I have shown an embodiment for carrying out my invention but it will be evident that other instrumentalities may be employed and the arrangement of the parts may be varied without departing from the spirit of my invention and I do not therefore desire to be limited in every instance to the exact construction as herein shown and described but desire to make such changes as may be necessary.

1 designates a vessel for the conveyance or storage of liquids, the same consisting of the two receptacles 2 and 3, which are preferably of glass and suitably connected together, forming the space 4 therebetween from which the air is evacuated or exhausted, forming a vacuum between the receptacles, the walls of which having been previously supplied with a suitable coating of silver 5.

6 designates a casing which is adapted to receive the receptacles, said casing being preferably of metal and being formed to provide a space between it and the outer surface of the outer receptacle, in which space is adapted to be seated, any suitable means for holding the receptacles in proper position. In the present instance I have shown a corrugated cardboard 7 for this purpose. The neck of the casing 6 is formed with threads 8 turned downwardly.

In order to permit of the insertion of the receptacles 2 and 3, I provide a removable bottom cap 9 which is formed in any suitable manner and the walls 10 of which are adapted to engage with the casing 6 so that said cap will be positively held in position, it being understood that a suitable frictional engagement or connection is provided between the wall 10 and the wall of the casing 6 to insure that the cap is properly held in position. In some instances I may form a shoulder or stop 11 upon the inner wall of the casing 6, against which the edge of the wall 10 of the cap 9 abuts in order to prevent the improper positioning of said wall 10 with respect to the casing 6. The lower portion 12 of the wall of the casing 6 may be slightly tapered and inclined inwardly in order to provide a positive frictional engagement between it and the wall 10 of the cap 9 for holding the parts in proper position. In some instances I may provide other means within the casing 6 against the edge of which means the upper edge of the wall 10 of the cap 9 abuts said ring thus serving as a shoulder or stop for the parts and acts in the same manner as the shoulder 11.

As will be understood from the above I provide a removable cap for the casing which is adapted to have suitable engagement or connection therewith so that the parts cannot be accidentally separated but which permits ease of insertion of the receptacles into the casing, it being understood that any suitable means may be employed for connecting the parts in the desired manner.

Having thus described my invention, what I claim as new and desire to secure by Letters Patent, is:

In a device of the character described, separated receptacles having a vacuum therebetween, a casing for said receptacles, the lower portion of said casing being slightly tapered, a removable bottom cap for said casing and a stop internal of the casing for limiting the relative movement of said cap and casing.

WILLIAM H. KELLER.

Witnesses:
C. D. McVay,
J. C. McGlashen.